Dec. 23, 1952  
W. A. VENUS  
2,622,565  
CONTROL DEVICE FOR HYDRAULICALLY  
OPERATED WORKING CYLINDERS  
Filed Sept. 28, 1949
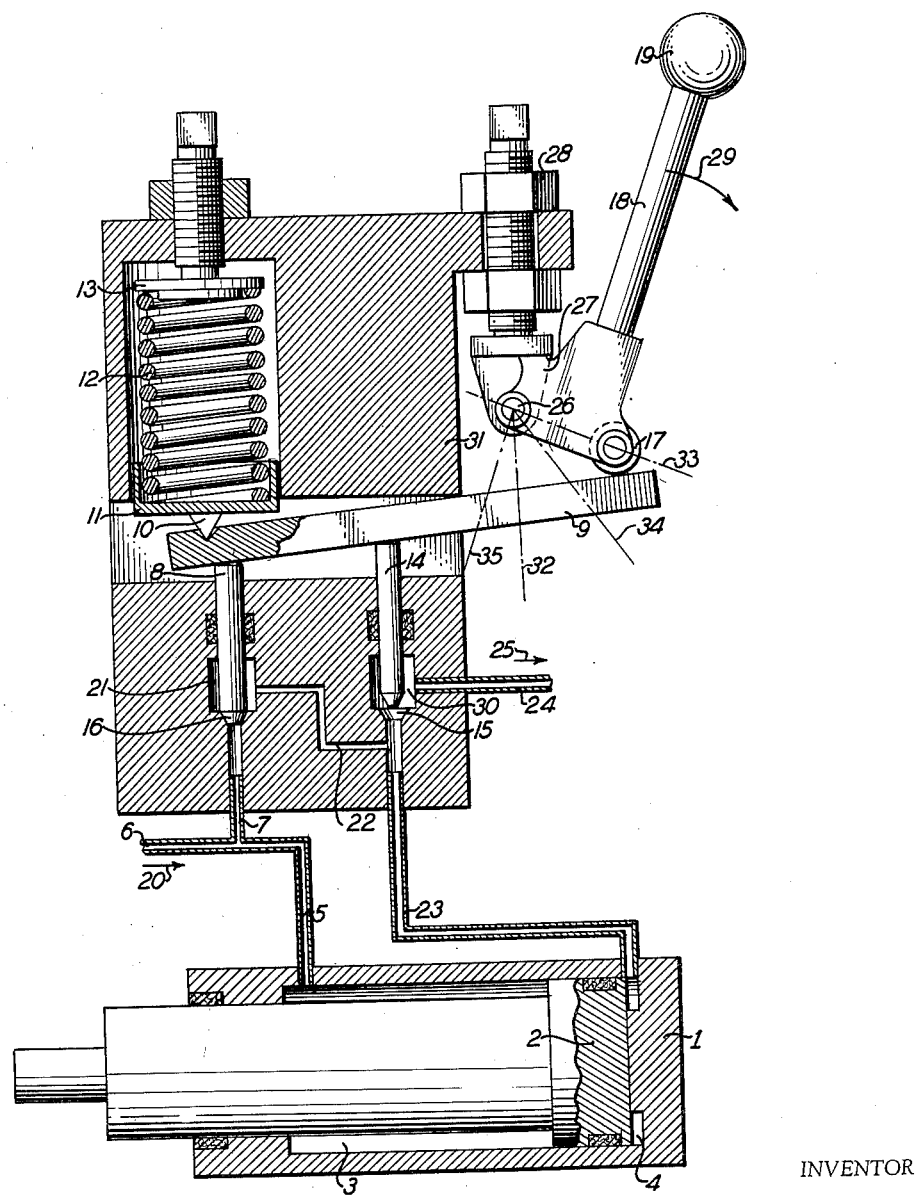
INVENTOR  
WILIBALD A. VENUS
BY  
*Young, Emery & Thompson*  
ATTORNEYS Patented Dec. 23, 1952

2,622,565

UNITED STATES PATENT OFFICE 2,622,565

CONTROL DEVICE FOR HYDRAULICALLY OPERATED WORKING CYLINDERS

Wilibald A. Venus, Munich, Germany, assignor to Hahn & Kolb, Stuttgart-N, Germany Application September 28, 1949, Serial No. 118,281
In Germany October 1, 1948

6 Claims. (Cl. 121—46.5)

1

The invention relates to a device for controlling a hydraulically operated working cylinder by means of two control valves, the movable members of which being directly influenced, in the opening direction, by the pressure of a pressure fluid and in the closing direction by common spring means and a common lever.

Prior devices of said kind have the disadvantage that the lever, after the operator has removed his hand, returns to its position of rest under the pressure of the pressure fluid. Thereby, the working cylinder undesirably returns into its rest position after each operation of the lever. If the spring acts on the lever between said two valves, the return of the lever to its position of rest immediately stops the working piston in an intermediate position, where it happens to be. But if the spring acts on a free end of the lever, one of the valves will remain open, so that the piston will move into one of its two end positions. This, however, does not meet actual requirements.

Other known devices have valves in which the movable valve members are positively connected together and are constructed in such a way that the control lever moved by hand into one of its two end positions, remains in said position, thus securing the corresponding control position. Accordingly, the working piston also remains in one of its two end positions. This means a drawback, as it is impossible to stop the working piston in the intermediate position desired.

One object of the present invention is to avoid the drawbacks of the known devices and, to satisfy the requirements of actual practice with regard to the possibility that, on the one hand, the control mechanism is secured in each of its two end positions and, on the other hand, the working piston can be stopped in each intermediate position without necessitating continuous supervision. Contrary to the known devices which fulfill either the one or the other condition, the invention is characterized by hand-operated control means secured by abutments and by spring means in each of their two end positions, said control means and said spring means being operatively connected with the different ends of an operating lever, while the two movable members of the valves, influenced by the pressure of the pressure fluid, are in operative connection with the control position of said lever.

Another preferable object of the invention is to connect the operating lever with auxiliary means in such a manner that the pressure of the pressure fluid, of the auxiliary means, and of the spring means are in equilibrium with one another in such an intermediate position of the lever that both movable valve members simultaneously come to rest in their closing positions. Preferably the lever is rotatable in such a manner that, when the control means is moved from one to the other extreme position, the lever changes its axis of rotation from its connecting point with the one movable valve member to its connecting point with the other movable valve member.

The drawing will show an example of the present invention; its description will reveal further characteristics thereof.

1 is a working cylinder and 2 a working piston longitudinally movable therein. The working piston can be connected with the reciprocating working table of a machine tool or a die-casting machine or the like. 3 is the smaller and 4 the larger fluid pressure chamber of working cylinder 1. 5 is a conduit leading into chamber 3 and is connected to a supply conduit 6. 7 is another conduit, connected with conduit 5 as well as with conduit 6 and leading to the conical face of a movable valve member 8. The upper ball-shaped end of the movable valve member 8 acts on a lever 9, notch 10 of which serves as a bearing for one end of a coil spring 12. The other end of spring 12, and therewith the pretension of the spring, can be adjusted by means of an adjusting screw 13. In close connection with lever 9 is also the ball-shaped head of a second movable valve member 14 which is lifted from its valve seat 15 as may be seen from the drawing, whilst the movable valve member 8 is shown seated tightly, under the influence of the spring 12, on its valve seat 16. The coil spring 12 is adapted to swing the lever 9 on the ball-shaped head of the movable valve member 8 in such manner that its free end shown at the right side of the drawing, comes in close connection with a roller 17 of an operating lever or operating means 18 rotatably mounted on a pivot 26. The pretension of the coil spring 12 is such as to hold the operating member 18 loaded with a weight 19 or other servo means in the end position shown in the drawing arrested by an abutment 27. Its pivot 26 and abutment 27 can be adjusted by a screw 28. The torques exerted by the forces of spring 12 and of operation means 18 upon lever 9 have opposite directions. The fluid pressure acting on the conical portion of movable valve member 8 through conduit 6 is in no case sufficient to lift spring 12 and thereby change the position of rest shown in the drawing.

From a fluid chamber 21 arranged behind the valve seat (seen in direction 20 of the liquid flow) a connecting line 22 leads via line 23 to working chamber 4. Fluid chamber 30 situated above seat 15 is connected with an outlet conduit 24. Line 22 enters—seen in the direction 25—line 23 by-passing valve seat 15.

The drawing shows working piston 2 in its extreme right position. This extreme position results from the fact that fluid entering at 6 can flow via conduit 5 to working chamber 3, whilst working chamber 4 is connected via conduit 23 with outlet conduit 24.

Control means 18 can be swung from its position represented in the drawing and marked by dash-and-dot line 33 through the axis of rotation of pivot 26 and roller 17, in the direction of arrow 29 about its pivot 26, thereby pressing lever 9 downward, whereby lever 9 performs a tilting movement about the ball-shaped head of the movable valve member 8 against the tension of coil spring 12, and presses movable valve member 14 on its seat 15.

After both valves 8, 16 and 14, 15 have been closed, lever 9 has no longer the possibility to swing about the ball-shaped head of valve member 8 as an axis of rotation, but rotates about the ball-shaped head of the now stationary valve member 14 thereby lifting the lower end of spring 12. Through retaining cup 11 the lifting movement of spring 12 will be followed, under the pressure of the fluid entering through conduit 7, by movable valve member 8, so that the pressure fluid enters through conduits 22, 23—by-passing the closed valve 14, 15—into the working chamber 4. This is the case when roller 17 in position 32 of control means 18 has reached its lowest position. Control means 18 can be swung further until it touches in position 35 abutment 31. In this position 35 fixed by abutment 31 the coil spring 12 cannot cause control means 18 to swing back, as roller 17 has reached its position to the left of dead-center position 32 marked by dash and dot line. In this fixed position of control means 18 the fluid having entered working chamber 4 presses working piston 2 to the left, as now its larger right face is under the pressure of the fluid.

When control means 18 is removed from its position of rest 35 fixed by abutment 31, lever 9 will rotate about the head of movable valve member 14 as its axis of rotation, until both valves 8, 16 and 14, 15 are closed in position 34. In this closed position of the valves, fluid can no longer pass into conduit 24. Therefore, the movement of working piston 2 will stop, in whatever intermediate position the piston may be. Coil spring 12 and weight 19 have such dimensions that they cannot produce, in said intermediate position 34, any movement of control means 18.

When control means 18 will be removed from the aforementioned intermediate position 34 into the position of rest shown in the drawing, lever 9 will no longer swing about the head of movable valve member 14, but about the head of the other movable valve member 8.

Valve member 14 now moves upward, and fluid flows, on the one hand from working chamber 4 via conduit 23 to outlet conduit 24 and, on the other hand, from supply conduit 6 into working chamber 3, thus causing the rightward movement of working piston 2.

This movement will continue until piston 2 has reached its position of rest represented in the drawing. Should, however, control means 18 be swung beforehand in direction of arrow 29 e. g. to intermediate position 34, the movement of the piston would be interrupted in its momentary intermediate position, and the piston would reverse its movement if control means 18 would be moved to abutment 31.

Summarizing, the following can be obtained by simply operating the single control means 18, when pivot 26 is located between the two extreme positions 33, 35 of roller 17 acting on lever 9.

Swinging control means 18 into its extreme position 35 causes a movement of working piston 2 to the left and swinging said means into extreme position 33 a movement of working piston 2 to the right. These movements continue until either the corresponding rest position of the piston has been reached or the movement of the piston will be interrupted at any intermediate position by simply swinging control means 18 by hand into its intermediate position 34. An additional operation of control means 18 e. g. keeping it by hand in one of the three positions 33, 34, 35 is not necessary, as in both extreme positions 33, 35 control means 18 is secured by coil spring 12, acting on one free end of lever 9, and by control means 18, acting on the other free end of lever 9, and by abutments 27, 31, whilst for securing intermediate position 34 the auxiliary force 19 balances all other adjusting forces in a very simple and advantageous way. Therefore control means 18 can be adjusted with a minimum of operational power and requires only a small control movement (rotation of control means 18 may be below 90 deg.).

Use of lever 9 which acts on ball-shaped ends of movable valve members 8, 14, is mainly responsible to bring forth the results mentioned before. The spring 12 and control means 18 must act on the opposite ends of lever 9 and the inlet valve 8, 16 should be preferably arranged near the spring.

I claim:

1. In a die casting injection moulding or like machine, a device for controlling a hydraulically operated working cylinder comprising two control valves having movable members forced in the opening direction by the pressure of a pressure fluid, a lever abutting against the movable members, a spring means and a control means each acting on the opposite ends of the lever, said spring means being common to both valves to mutually hold the one, the other or both in their closing positions, said control means being secured by abutments and said spring means in both its extreme positions to mutually hold the one or the other of the control valves in its closed position, and having an intermediate position in which the lever holds the two valves in their closed positions, said intermediate position being provided by a weight which is in equilibrium with said spring means and said fluid pressure exerting their power on the movable valve members.

2. In a die casting injection moulding or like machine, a device for controlling a hydraulically operated working cylinder comprising two control valves having movable members forced in the opening direction by the pressure of a pressure fluid, a lever abutting against the movable members, a spring means and a control means each acting on opposite ends of the lever, said spring means being common to both valves to mutually hold the one, the other or both in their closing positions, and said control means being secured by abutments and said spring means, in both its extreme positions to mutually hold the one or the other of the control valves in its closed position and having an intermediate position in which the lever holds the two valves in their closed positions, the axis of rotation of the lever changing when adjusted by said control means from a head of one movable valve member to a head of the other movable valve member, and means provided to prevent the lever from being shifted in lengthwise direction by a recess and a nose correspondingly provided on the lever and in the spring means or one of the heads of the movable valve members or the control means.

3. In a die casting injection moulding or like machine, a device for controlling a hydraulically operated working cylinder comprising two control valves having movable members forced in the opening direction by the pressure of a pressure fluid, a lever abutting against the movable members, a spring means and a control means each acting on opposite ends of the lever, said spring means being common to both valves to mutually hold the one, the other or both in their closing positions, and said control means being secured by abutments and said spring means, in both its extreme positions to mutually hold the one or the other of the control valves in its closed position and having an intermediate position in which the lever holds the two valves in their closed positions, one of the valves being arranged near the point where the spring means contacts the lever, and the spring means being adjustable.

4. In a die casting injection moulding or like machine, a device for controlling a hydraulically operated working cylinder comprising two control valves having movable members forced in the opening direction by the pressure of a pressure fluid, a lever abutting against the movable members, a spring means and a control means each acting on opposite ends of the lever, said spring means being common to both valves to mutually hold the one, the other or both in their closing positions, and said control means being secured by abutments and said spring means, in both its extreme positions to mutually hold the one or the other of the control valves in its closed position and having an intermediate position in which the lever holds the two valves in their closed positions, the axis of rotation of the control means being arranged between the two points at which the control means acts in its two end positions on the lever.

5. In a die casting injection moulding or like machine, a device for controlling a hydraulically operated working cylinder comprising two control valves having movable members forced in the opening direction by the pressure of a pressure fluid, a lever abutting against the movable members, a spring means and a control means each acting on opposite ends of the lever, said spring means being common to both valves to mutually hold the one, the other or both in their closing positions, and said control means being secured by abutments and said spring means, in both its extreme positions to mutually hold the one or the other of the control valves in its closed position and having an intermediate position in which the lever holds the two valves in their closed positions, a pivot of the control means being adjustably arranged to adjust the strokes of both movable valve members.

6. In a die casting injection moulding or like machine according to claim 1, in which the weight is arranged as a weight on a handle of the control means.

WILIBALD A. VENUS.

REFERENCES CITED

The following references are of record in the file of this patent:

UNITED STATES PATENTS

| Number | Name | Date |
| --- | --- | --- |
| 1,644,093 | Shonnard | Oct. 4, 1927 |
| 2,134,208 | Schofield | Oct. 25, 1938 |
| 2,142,628 | Ballert | Jan. 3, 1939 |
| 2,232,038 | Stone | Feb. 18, 1941 |
| 2,240,163 | Pick | Apr. 29, 1941 |
| 2,243,937 | Almond | June 3, 1941 |

FOREIGN PATENTS

| Number | Country | Date |
| --- | --- | --- |
| 443,851 | Great Britain | Mar. 9, 1946 |